May 23, 1933.  E. D. TILLYER  1,910,577
SOUND REPRODUCTION
Original Filed Feb. 13, 1931
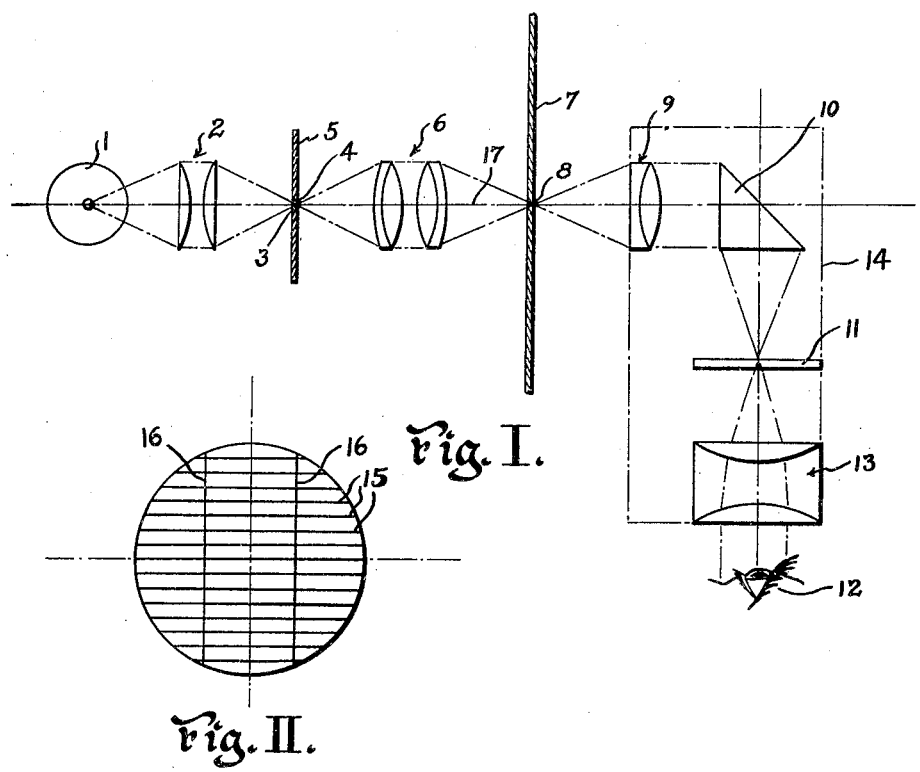
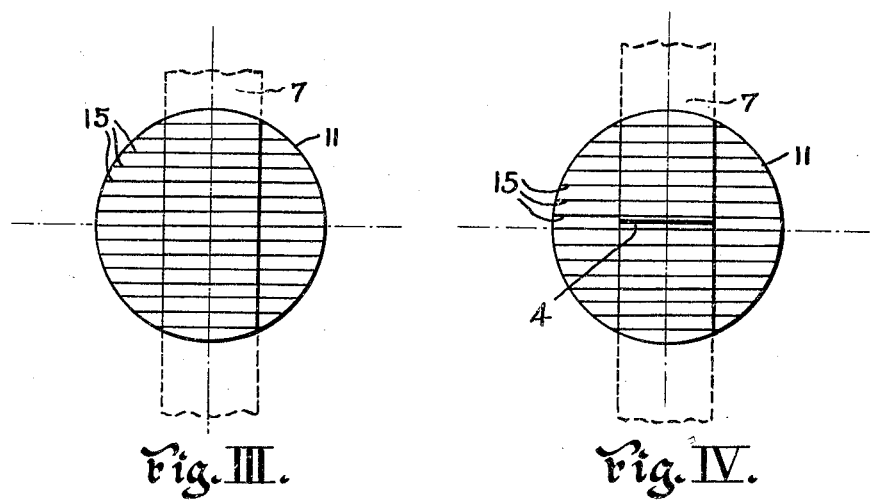
INVENTOR
Edgar D. Tillyer.
BY
Harry H. Styll
ATTORNEY Patented May 23, 1933

1,910,577

UNITED STATES PATENT OFFICE

EDGAR D. TILLYER, OF SOUTHBRIDGE, MASSACHUSETTS, ASSIGNOR TO RADIO CORPORATION OF AMERICA, A CORPORATION OF DELAWARE

SOUND REPRODUCTION

Application filed February 13, 1931. Serial No. 515,431.

This invention relates to improvements in apparatus for reproducing sound photographically and particularly to improved means and process for focussing and aligning the image of the light slit on the film of such an apparatus.

The principal object of the invention is to provide improved means for observing the relation of the image of the light slit and the focus thereof to and on the film.

Another object of the invention is to provide improved optical means for ascertaining the alignment of the image of the light slit on the film and the focus thereof.

Another object of the invention is to provide simple, efficient, economical and readily operable means for viewing the position and focus of the light slit on the film.

Another object of the invention is to provide an improved process, and means to carry out the same, for aligning and focussing a streak of light with and on the sound tract of a sound tract film.

Other objects and advantages of the invention will become apparent from the following description taken in conjunction with the accompanying drawing. It will be apparent that many changes in the details of construction and arrangement of parts and the steps of the process may be made without departing from the spirit of the invention as expressed in the accompanying claims. I therefore do not wish to be limited to the exact arrangements shown and described as the preferred form only has been shown and described by way of example.

In the operation of a sound film such as my invention applies to blackness of film increases or decreases as the air sound wave is under greater or less compression. The streak of light illuminates the photo-electric or photo-sensitive cell or other light sensitive means and produces an electric current corresponding to the density or blackness of the sound tract on the film, that is to say each individual part of the film that passes through the projected light.

This invention relates in particular to the production of an optical system for use in connection with a sound film operated by streak reproduction, that is to say the sound is reproduced by a photo-electric or photosensitive cell behind the film by means of a streak of projected light on the sound tract of the film and is thereafter amplified so as to be heard and distinguished by the human ear.

In the past great difficulty has been experienced in getting and keeping the image of the light slit at exact focus and at proper angular relation to the film thereby causing improper reproduction of the sound effects and a decrease in the efficiency of the apparatus especially of the higher tones necessary for the distinctness of speech. It is therefore an important object of my invention to provide a method and means by which these defects may be overcome and remedied.

Referring to the drawing:

Fig. I is a diagram of a device for reproducing sound photographically in which the invention is embodied;

Fig. II is a plan view of the reticule;

Fig. III is a plan view of the reticule with a portion of the film projected thereon, and Fig. IV is a plan view of the reticule with a portion of the film projected thereon and the image of the slit projected on the film.

In the drawing in which like characters denote corresponding parts throughout and referring specifically to Fig. I, the source of light is indicated at 1. A lens 2 focusses the light at the point 3 on the slit 4 of the slit member 5. The slit member 5 comprises a plate having the narrow light slit 4 therein as in prior art machines. This slit member is movably mounted so that the plate may be moved to position the image of the slit on the film so that the image will lie transversely across the film.

A lens 6 is adjustably mounted so that the light from the slit 4 may be focussed exactly on the film 7 at 8. Behind the film 7 on the photo-electric or photo-sensitive cell side thereof and preferably designed so that it may be held in place by the support of the photo-electric or photo-sensitive cell, I place my improved device for viewing the image of the slit on the film. It comprises the lens 9 and prism 10 so mounted that the light coming through the film at 8 will be focussed on the reticule 11 so that the image of the light streak and the outline of the film will be projected thereon. The image on the reticule is viewed by the eye located at 12 through the magnifying eyepiece 13.

It will be understood that the parts of the viewing device are aligned and supported in position on a support or base 14 which slips into and out of position on the photo-electric cell holder or other supports the photo-electric cell being removed when the viewing device is in place for operation. The reticule may be turned and moved back and forth to focus it. The eyepiece may also be focussed in the manner usual with eyepieces. The eyepiece magnifies the image on the reticule.

The reticule 11 is a transparent plate and is marked with the cross lines 15 and with the lines 16. The lines 16 are placed to correspond with the edges of the sound track on the film 7.

The operation of the device and process are as follows: The photo-electric or photo-sensitive cell is removed from its support and the viewing device mounted on the base 14 and aligned with the film by sliding the base into its receptacles on the support of the photo-electric cell. The eyepiece 13 is adjusted to give a clear view of the image on the reticule 11. The reticule is then adjusted until the lines 16 thereon correspond with the edges of the film sound track 7 as shown in Fig. III. The image of the slit 4 is then adjusted until it lies parallel with the lines 15 as shown in Fig. IV. This is done by moving the slit member 5. The image of the slit 4 is then focussed on the film at 8 by adjusting the lens 6. The alignment of the image of the slit on the film and its focus will be clearly seen on the reticule when viewed through the eyepiece. When the image has been adjusted the viewing device may be removed from the support and the photo-electric or photo-sensitive cell replaced in place thereon.

It is very essential in focussing the image of the light slit on the sound tract of the film that the record be exactly in the focus of the slit and that the image be exactly parallel to the sound variation, that is to say, perpendicular or normal to the film strip. With my device one can actually see the image of the slit on the film to determine whether it is focussed on the film and at the correct angle thereto.

The image is made by a very large angled cone of light by the lens 6 at 17. It is about two to one so if the focus is out say 0.004 of an inch there would be a band 0.002 of an inch wide in addition to the 0.001 of an inch of the slit or a total of 0.003 of an inch instead of 0.001 of an inch which would cut out the higher notes. Unless the slit is normal to the length of the film the higher notes are also eliminated and distinctness is lost.

From the foregoing description it will be seen that I have provided simple, economical and efficient means for carrying out all the objects and advantages of the invention and in particular have provided means whereby a fine line of light may be focussed and correctly positioned on the sound track of such an apparatus.

Having described my invention I claim:

1. In a device of the character described for use with a device for projecting a slit of light through a sound tract film onto a photo-sensitive cell, means comprising a single unit adapted to replace the photo-sensitive cell for determining the position and focus of said slit of light with respect to the sound tract of the film, said means consisting of an attachment fitting in the photo cell holder and having observing means thereon adapted to assume the related position of the cell relative to the path of light coming from the slit, said observing means comprising a projection lens focusable on the sound tract on the film and adapted to receive the light from the slit, deflecting means in aligned relation with the projection lens adapted to receive the light projected by said projection lens and direct it to a focal point at an angle to the principal path of light and a reticule plate positioned at the focal point of the projected light and at a fixed position as determined by the projection lens so as to determine the focus of the light slit relative to the sound tract on the film and having indicator means thereon for determining the position of the light slit relative to said sound tract.

2. In a device of the character described for use with a device for projecting a slit of light through a sound tract film onto a photo-sensitive cell, means comprising a single unit adapted to replace the photo-sensitive cell for determining the position and focus of said slit of light with respect to the sound tract of the film, said means consisting of an attachment fitting in the photo cell holder and having observing means thereon adapted to assume the related position of the cell relative to the path of light coming from the slit, said observing means comprising a projection lens focusable on the sound tract on the film and adapted to receive the light from the slit, a prism lens in aligned relation with the projection lens adapted to receive the light projected by said projection lens and direct it to a focal point at an angle to the principal path of light, a reticule plate positioned at the focal point of the projected light and at a fixed position as determined by the projection lens so as to determine the focus of the light slit relative to the sound tract on the film and having indicator means thereon for determining the position of the light slit relative to said sound tract and a magnifying eyepiece for viewing the image on the reticule.

3. In a device of the character described for use with a device for projecting a slit of light through a sound tract film onto a photo-sensitive cell, means comprising a single unit adapted to replace the photo-sensitive cell for determining the position and focus of said slit of light with respect to the sound tract of the film, said means consisting of an attachment fitting in the photo cell holder and having observing means thereon adapted to assume the related position of the cell relative to the path of light coming from the slit, said observing means comprising a projection lens focusable on the sound tract on the film and adapted to receive the light from the slit, a prism lens in aligned relation with the projection lens, adapted to receive the light projected by said projection lens and direct it to a focul point at an angle to the principal path of light and a reticule plate positioned at the focal point of the projected light and at a fixed position as determined by the projection lens so as to determine the focus of the light slit relative to the sound tract on the film and having indicator means thereon for determining the position of the light slit relative to said sound tract, said projection lens, prism and reticule plate being in fixed related positions relative to each other and being adapted to be positioned by the attachment fitting in desired relation relative to the sound tract on the film.

EDGAR D. TILLYER.